United States Patent [19]

Siegrist

[11] Patent Number: 5,097,927
[45] Date of Patent: Mar. 24, 1992

[54] VEHICLE BRAKE

[76] Inventor: Eric Siegrist, R.R. #2, Wiarton, Ontario, Canada, N0H 2T0

[21] Appl. No.: 297,133

[22] Filed: Jan. 17, 1989

[51] Int. Cl.5 .............................................. F16D 65/10
[52] U.S. Cl. .................................. 188/218 R; 188/76; 188/264 R; 192/73; 192/107 T; 192/113 A
[58] Field of Search .................. 188/218 R, 264 R, 76; 192/73, 107 T, 113 A

[56] References Cited

U.S. PATENT DOCUMENTS

| | | | |
|---|---|---|---|
| 1,186,224 | 6/1916 | Murray | 188/218 R |
| 1,953,217 | 4/1934 | Evans | 188/218 R |
| 2,241,241 | 3/1941 | Clouse | 192/113 A |
| 2,265,938 | 12/1941 | Eksergian | 188/264 R |
| 2,757,970 | 8/1956 | Curell | 188/218 R X |
| 2,783,858 | 3/1957 | Murphy | 188/76 |
| 3,993,172 | 11/1976 | Schmitz | 188/264 R X |
| 4,807,728 | 2/1989 | Suenaga et al. | 188/218 R X |

FOREIGN PATENT DOCUMENTS

| | | | |
|---|---|---|---|
| 1001 | 1/1985 | Japan | 188/218 R |
| 519985 | 4/1940 | United Kingdom | 188/218 R |
| 673569 | 6/1952 | United Kingdom | 188/264 R |

Primary Examiner—George E. A. Halvosa

[57] ABSTRACT

The present invention relates to a vehicle brake and hub comprising a ring braking member having braking surfaces both to the interior and exterior of the member in combination with a cast hub which includes centrally disposed aligned bearing ports for receiving bearings. The cast hub includes an outwardly exposed securing surface which cooperates with the ring braking member to effect securement of the braking member to the casting and in a manner to accommodate heat transfer therebetween. The cast hub includes intermediate the securing surface and the aligned ports, fan blades which cause during rotation of the hub an axial flow of air to move across the bearing ports and to extract heat from the fan blades and the securing surface. The fan blade collectively interconnect and structurally secure the securing surface and the bearing ports.

6 Claims, 3 Drawing Sheets

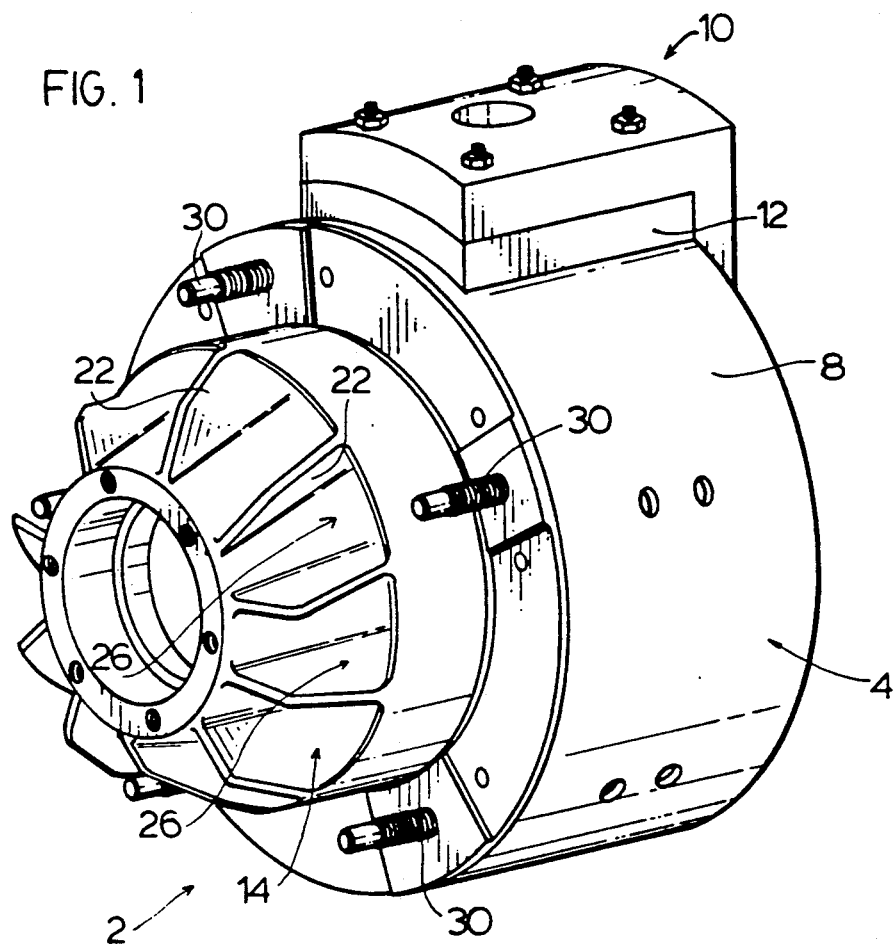
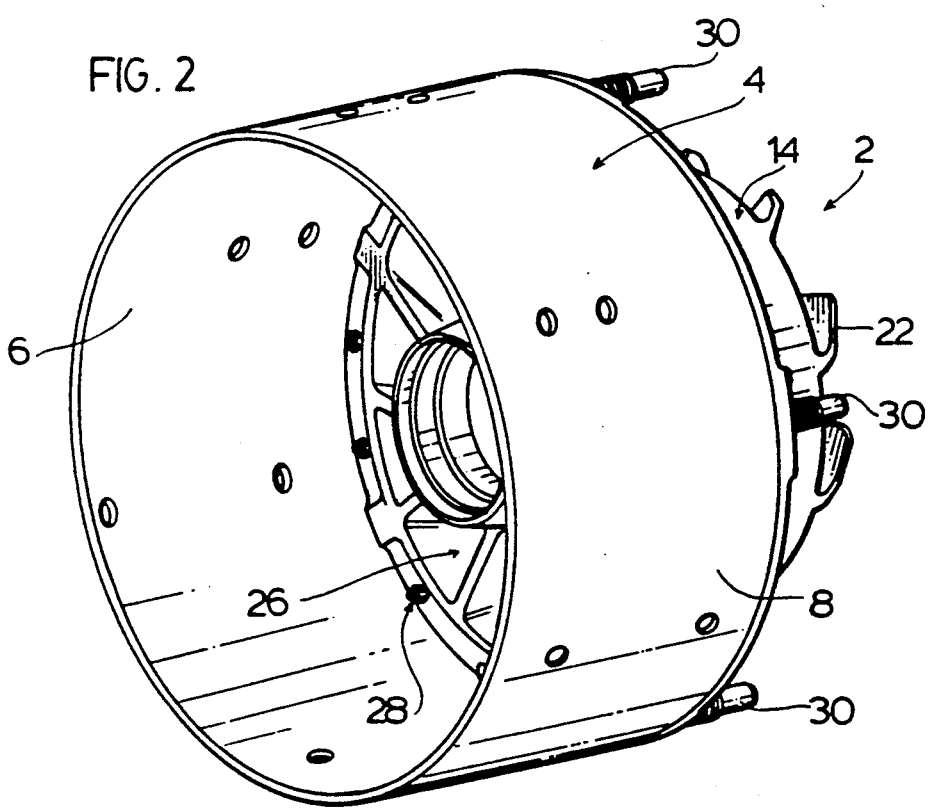

VEHICLE BRAKE

BACKGROUND OF THE INVENTION

This application relates to the subject matter of earlier application Ser. No. 07-022,512 filed 03-09-87 which was a continuing application of application Ser. No. 06-792,213 filed 10-28-85, both now abandoned.

The present invention relates to vehicle braking systems and in particular to vehicle braking systems having associated therewith an air flow for removing heat from the braking system.

There are a host of different braking arrangements for vehicles which have been proposed, with the most popular braking system being either the Drum Brake or more recently the Disk Brake. In addition to these two types of braking systems there is also what is referred to as a Ring Brake as generally shown in the U.S. Pat. No. 3,170,542 where braking can occur on both sides of the ring brake member.

Common to all of these braking systems is the dissipation of energy by means of heat which is generated at or on the braking surface. This heat is dissipated to the surrounding air environment by means of convection, however, due to the placement of the brake generally in a confined region under a vehicle, the circulation of air is relatively poor and the convection coefficient of heat transfer is relatively low. This problem of heat build-up is particularly acute where the brake must be operated frequently over a long period of time and thus the braking system does not have an opportunity to dissipate the heat when the brake is not in use. Such circumstances commonly occur with truck braking systems, particularly in mountains regions, and the possibility of brake failure is quite acute. For example, there are often run-off regions where vehicles that are out of control (i.e. where braking system is substantially lost) may exit into these regions which are designed to stop the vehicle.

Most conventional car braking systems operate satisfactorily, however, braking systems used to maximum, say eight times in a row, result in the effective braking power to be less than 50%. The principle reason for the reduction in braking power is heat build-up within the braking system.

Another problem associated with vehicle braking systems is in the transmission of the heat generated in the braking system to the wheel bearing of the vehicle. Wheel bearings have generally been protected from transfer of heat from the braking system, as the life of the wheel bearing would be substantially reduced if exposed to the heat generated in the braking system. Therefore, the prior practice has been to isolate the wheel bearing from a direct heat transfer path of the braking surface to the wheel bearing.

There remains a need for a simple effective braking system where heat can be efficiently removed from the braking surface to improve both the life and performance of the braking system.

SUMMARY OF THE INVENTION

A vehicle brake and hub according to the present invention comprises a ring braking member having braking surfaces to both the interior and the exterior of the member. A cast hub is provided which includes centrally disposed aligned bearing ports for receiving bearings, in combination with an outwardly exposed securing surface which cooperates with the ring braking member to effect securement of the ring braking member to the casting and in a manner to accommodate heat transfer therebetween. The cast hub includes intermediate the securing surface and the aligned ports, fan blades which cause, with rotation of the brake and hub, an axial flow of air to move across the bearing ports and to extract heat from the fan blades of the securing surface. The fan blades collectively interconnect and structurally secure the securing surface to the bearing ports.

The ring braking member, the securing surface and the fan blades collectively cooperate such that, under high heat load generation at the ring braking member, heat is efficiently dissipated from the ring brake member by means of convection heat transfer to the surrounding air and by means of conduction heat transfer to the securing surface and to the fan blades which is subsequently removed by convection from the fan blades to the air flow passing over the fan blades during the rotation of the vehicle brake and hub.

The present invention recognizes that heat cannot be effectively dissipated by the ring braking member alone and this heat can be advantageously removed by means of the cast hub acting as a heat sink. In addition, the invention recognizes that the cast hub cannot solely act as a heat sink, and the hub has been adapted to dissipate heat from the hub to the surrounding air. The normal heat transfer by means of convection would not be sufficient, therefore, the hub is modified to provide an air flow which serves to dissipate or remove heat from the fan blades as the air flows through the hub. This air flow serves to remove heat and protect the bearing ports provided at the center of the hub. Thus, although the hub itself is designed to act as a heat sink, the resulting air flow through the hub maintains the center of the hub cool and, similarly, the ring braking member is relatively cool due to the heat transferred to the hub.

BRIEF DESCRIPTION OF THE DRAWINGS

The preferred embodiments of the invention are shown in the drawings, wherein:

FIG. 1 is a perspective view of the vehicle brake and hub;

FIG. 2 is a perspective view of the vehicle brake and hub from a different angle;

DETAILED DESCRIPTION OF THE PREFERRED EMBODIMENTS

Figure 3:
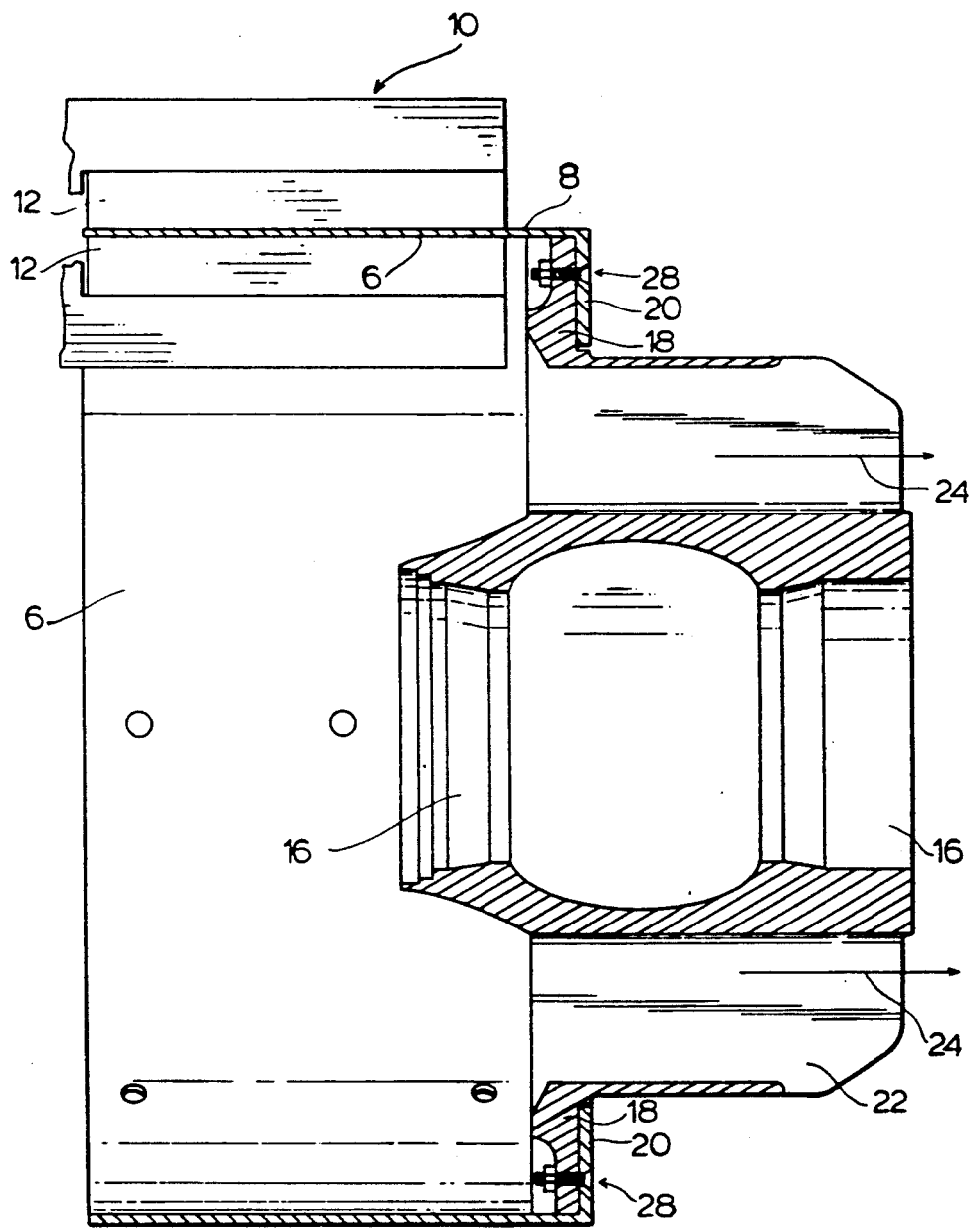
FIG. 3 is a sectional view through the hub of FIG. 2.
Figure 4:
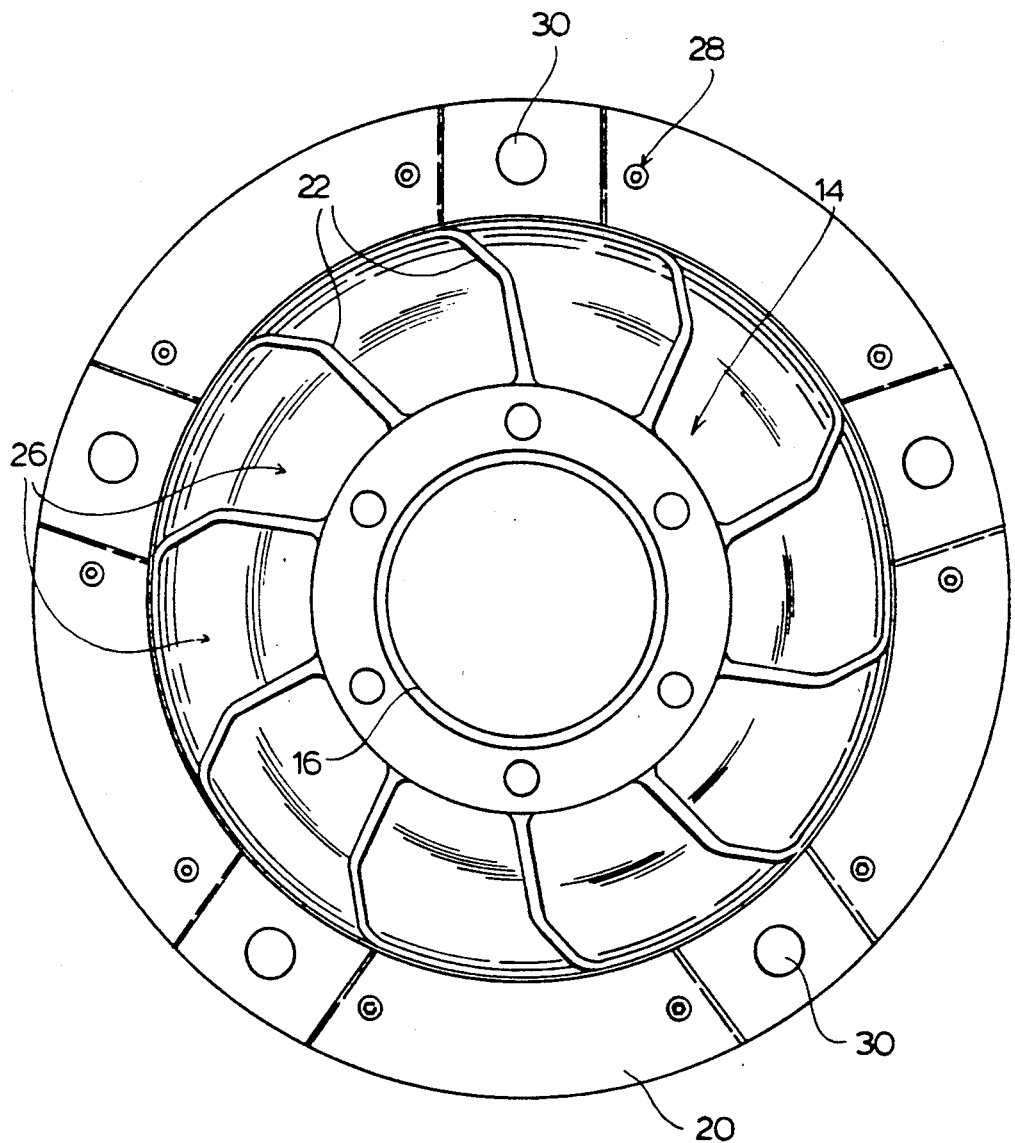
FIG. 4 is a plan view of the cast hub and ring brake.

The vehicle brake and hub is generally shown as 2 in the drawings and comprises a ring braking member 4 having interior braking surface 6 and exterior braking surface 8. The caliper 10 can slide over one end or edge of the braking member to position braking pads 12 directly opposite the braking surfaces 6 and 8.

A cast hub 14 is shown having centrally disposed aligned bearing ports 16 for receiving axle bearings. The cast hub 14 has, at an exterior edge thereof, a securing surface 18 in the form of an annular ring. This securing surface 18 cooperates with the corresponding inwardly directed radial flange 20 of the ring brake member 4. Fan blades 22 form the connection between the outwardly disposed securing surface 18 and the centrally disposed aligned bearing ports 16.

The location of the mating of the radial flange 20 in securing surface 18 is generally intermediate the two bearing ports 16 and as such, heat would have to move outwardly to these bearing ports. Intermediate the fan blades 22 and the securing surface 18 are air conduits 26 which with rotation of the hub produce an air flow generally indicated as 24 through the air conduits which remove heat from the blades. This heat is removed by convection and is transferred to the forced air flow 24. Securement of the ring brake member 4 to the cast hub 14 is accomplished by means of the nut and bolt arrangement generally shown as 28 in the drawings. In addition, the securing surface 18 includes wheel rim studs generally shown as 30 by means of which the wheel rim can be secured to the vehicle brake and hub 2.

When heat is generated on the braking surfaces 6 and 8 by means of the braking pads 12 being brought into pressure contact with the braking surfaces 6 and 8, the heat can be dissipated from the ring brake member 4 by means of conduction through the ring braking member into the cast hub 14. The cast hub 14 acts as a heat sink to receive the heat from the ring braking member 4. Heat received by the cast hub will be transferred to the remaining portion of the cast hub and will tend to migrate towards the bearing ports 16, however, with rotation of a hub, the air flow 24 flows over the fan blades 22 and over the bearing ports 16 whereby heat can be removed from the cast hub member by means of forced convection. It has been found that it is beneficial to provide an efficient thermal transfer from the ring braking member 4 to the cast hub 14, even though this cast hub will be associated with the wheel axle bearing. It is more efficient to provide this excellent heat transfer which will allow the ring brake member to perform more consistently and more dependably and to provide an efficient means for dissipating the heat load resulting from braking by transferring it to the air flow forced through the hub. The air flow also serves to maintain the bearing at a cool operating temperature in spite of the fact that the cast hub acts as a heat sink for the ring braking member 4.

In considering assembly of the vehicle brake and hub, it can be appreciated from FIG. 3 that the ring braking member 4 can be sleeved over the cast hub 14 to bring flange 20 into abutting contact with securing surface 18. At this point, the nut and bolt arrangements 28 can secure the two components. This arrangement allows each of the separate components of the vehicle brake and hub to be manufactured separately and then assembled int eh particular manner described. This particular brake and hub is suitable for many applications from stock cars to large vehicle brakes used, for example, in trucks which require a large braking surface due to the relatively large loads. As can be appreciated, the braking surfaces 4 and 6 are generally at the same distance from the axis of rotation and do not have a decreasing net effect as found in a disc brake. It can also be appreciated that the size of the ring braking surface can be married to the particular braking application and the only limitation to date is in the design of the caliper generally shown as 10, as the far end of the caliper is effectively cantilever.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A vehicle brake and hub comprising:
   a ring braking member having braking surfaces to both the interior and exterior of said member, and
   a cast hub including centrally disposed aligned bearing ports for receiving axle bearings;
   said cast hub including an outwardly disposed securing surface which cooperates with said ring braking member to effect securement of said ring braking member to said casting and in a manner to accommodate efficient heat transfer by conduction therebetween such that said cast hub acts as a heat sink for said ring braking member.
   said cast hub including intermediate said securing surface and said aligned ports and to one side of said ring braking member, fan blades which cause, with rotation of said brake and hub, an axial flow of air to move across said bearing ports and to extract heat from said fan blades;
   said fan blades collectively interconnecting and structurally securing said securing surface to said bearing ports;
   said ring braking member, said securing surface and said fan blades cooperating such that, under high heat load generation at said ring braking member, heat is efficiently dissipated from said ring brake member primarily by means of conduction heat transfer to said securing surface and to said fan blades which heat is subsequently removed by convection from said fan blades to the air flow passing over said fan blades during rotation of said vehicle brake and, said fan blades being located to the exterior of said ring brake member and sized to provide said efficient heat dissipation by drawing air in an axial manner over said braking member and over said fan blades.

2. A vehicle brake and hub as claimed in claim 1, wherein said ring braking member has an inwardly directed radial flange mechanically connected to said securing surface which defines a corresponding radially extending flange.

3. A vehicle brake and hub as claimed in claim 1, wherein said fan blades define air conduits therebetween spaced about said bearing ports by means of which heat is removed by convection from said bearing ports to air within said air conduits.

4. A vehicle brake and hub as claimed in claim 3, wherein air is drawn from the interior of said hub through said conduits and is discharged exterior of said hub.

5. A vehicle brake and hub as claim din claim 3, wherein said cast hub includes an outer annular ring forming a mating surface with an inwardly directed radial flange of said braking member located at one edge thereof and mechanically secured to outer annular ring.

6. A vehicle brake and hub as claimed in claim 1, wherein said ring braking member includes spaced holes in the surface thereof extending between said interior and exterior braking surfaces.

* * * * *